United States Patent
Praharaj et al.

(10) Patent No.: US 11,467,785 B1
(45) Date of Patent: Oct. 11, 2022

(54) ADJUSTING PRINTER MAINTENANCE OPERATIONS

(71) Applicant: Xerox Corporation, Norwalk, CT (US)

(72) Inventors: Seemit Praharaj, Webster, NY (US); Jason M. LeFevre, Penfield, NY (US); Chu-heng Liu, Penfield, NY (US); Douglas K. Herrmann, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/468,805

(22) Filed: Sep. 8, 2021

(51) Int. Cl.
  *G06F 3/12* (2006.01)
  *B41J 3/54* (2006.01)
  *H04N 1/60* (2006.01)

(52) U.S. Cl.
  CPC ............ *G06F 3/1208* (2013.01); *B41J 3/543* (2013.01); *G06F 3/1205* (2013.01); *H04N 1/603* (2013.01)

(58) Field of Classification Search
  CPC combination set(s) only.
  See application file for complete search history.

(56) References Cited

U.S. PATENT DOCUMENTS

| | | | |
|---|---|---|---|
| 5,164,842 A | 11/1992 | Gauronski et al. | |
| 6,825,944 B1 * | 11/2004 | Noda | G06K 15/00 358/1.9 |
| 7,040,232 B2 | 5/2006 | Van Holten et al. | |
| 7,724,384 B2 | 5/2010 | Hwang et al. | |
| 8,294,929 B2 | 10/2012 | Kuwano | |
| 8,305,644 B2 * | 11/2012 | Nakamura | H04N 1/0009 358/1.9 |
| 8,780,365 B2 * | 7/2014 | Gerega | G06F 3/1285 358/1.9 |
| 2008/0154799 A1 * | 6/2008 | Campagna | G07B 17/00459 705/410 |
| 2008/0231888 A1 * | 9/2008 | Kuwano | H04N 1/32523 358/1.15 |
| 2020/0180308 A1 * | 6/2020 | Moriya | B41J 2/0458 |
| 2021/0138797 A1 * | 5/2021 | Hall | B41J 2/195 |

\* cited by examiner

*Primary Examiner* — Helen Zong
(74) *Attorney, Agent, or Firm* — Gibb IP Law Firm, LLC

(57) ABSTRACT

A processor maintains image quality degradation for a printing device. A communications device receives a print job that includes instructions to print a plurality of printed sheets in a sheet printing sequence. The processor generates a predicted output image for a mid-job sheet of the printed sheets based on the image quality degradation and the sheet count of the mid-job sheet within the sheet printing sequence. The printing engine alter printing characteristics to print a proof sheet matching an appearance of the predicted output image.

17 Claims, 8 Drawing Sheets

ADJUSTING PRINTER MAINTENANCE OPERATIONS

BACKGROUND

Systems and methods herein generally relate to printers and printing systems and more particularly to adjusting printer maintenance operations.

Printing machines having complex printheads using high fusion inks (HF) inks can suffer from a significant degradation in jet health with prolonged printing. The degradation of jet health manifests itself in poor directionality of the jets, split jets, weak jets, intermittent jets, and eventually missing jets. For example, some form of satellites for all colors sometimes occur. With sufficient jetting, the smallest of these satellites build up in volume on the printhead surface. The higher temperatures of high-speed printheads as well as the inherently fast drying nature of the high fusion inks, causes the ink build-up to dry resulting in possible obstruction in the nozzles and in poor jetting. For these reasons, the directionality of poorly jetting nozzles can be severely compromised.

For users who primarily engage in transactional printing, the presence of streaks may not represent a setback. However, for uses in graphic communication printing, streaks pose serious implications on the final image quality. With deterioration in image quality over time, the probability of a print job being unacceptable increases significantly. This represents a huge loss in both cost and time especially if it happens frequently enough. Current mitigation measure used to prevent print directionality degradation include a mini purge, but such actions are only performed on set schedules and not according to specific customer needs.

SUMMARY

Various methods herein maintain image quality degradation for a printing device based on historical performance of the printing device. These methods receive a print job that includes instructions to print a plurality of printed sheets in a sheet printing sequence.

In response, these methods generate a predicted output image for a mid-job sheet (of the printed sheets) based on the image quality degradation and the sheet count of the mid-job sheet within the sheet printing sequence. The image quality degradation predicts changes in printed image quality of sheets printed by the printing device over time. The process of generating the predicted output image is further based on the area coverage amount of marking material scheduled to be used printing the printed sheets that have a lower sheet count relative to the sheet count of the mid-job sheet. Thus, this generation of the predicted output image decreases the image quality estimate as the sheet count within the sheet printing sequence increases.

Next, these methods alter the printing characteristics of the printing device to print a proof sheet matching the appearance of the predicted output image. The printing characteristics are altered by turning off voltages to printing elements to represent failed printing elements, and by lowering peak piezo voltage (Vpp) applied to the printhead to represent misdirected printing elements.

In response, these methods receive feedback regarding the acceptability of the proof sheet. If needed, these methods can alter maintenance operations performed during printing of the print job based on such feedback. For example, the process of altering the maintenance operations can increase the frequency of print head cleaning and clearing procedures.

Printing devices herein include (among other components) a printing engine, a communications device, and a user interface operatively connected to a processor. The processor is adapted to maintain intra-job image quality degradation for the printing device based on historical performance of the printing device. The processor is adapted to maintain the intra-job image quality degradation by measuring changes in printed image quality of sheets printed by the printing device over time.

The communications device is adapted to receive a print job that includes instructions to print a plurality of printed sheets in a sheet printing sequence. The processor is adapted to generate a predicted output image for the printed sheets based on the intra-job image quality degradation and the sheet count of the printed sheets within the sheet printing sequence. When generating the predicted output image, the processor is adapted to decrease the image quality estimate as the sheet count within the sheet printing sequence increases.

The processor is adapted to identify reviewable mid-job sheets having a predicted output image that falls below an image quality standard. The processor is adapted to generate the predicted output image based on the area coverage amount of marking material scheduled to be used printing the printed sheets that have a lower sheet count relative to the sheet count of the reviewable mid-job sheets.

The printing engine is adapted to alter printing characteristics to print proof sheets matching the appearance of the predicted output image for each of the reviewable mid-job sheets. The printing engine is adapted to alter the printing characteristics by turning off voltages to printing elements to represent failed printing elements and lowering peak piezo voltage (Vpp) applied to the printhead to represent misdirected printing elements.

The user interface is adapted to receive feedback regarding the proof sheets. The processor is adapted to alter maintenance operations performed during printing of the print job based on the feedback. The processor is adapted to alter maintenance operations by increasing print head cleaning and clearing procedures.

These and other features are described in, or are apparent from, the following detailed description.

BRIEF DESCRIPTION OF THE DRAWINGS

Various exemplary systems and methods are described in detail below, with reference to the attached drawings, in which.

DETAILED DESCRIPTION

As mentioned above, with deterioration in image quality over time, the probability that a print job will be considered unacceptable by the user increases significantly. To address these issues, the systems and methods herein print a selection of mid-job proof prints from the customer submitted print job for user approval/disapproval. Maintenance operations are adjusted to reset the printing device if the user disapproves of the proof prints to achieve user-specific image quality goals. Predictive analytics can be used to determine the particular selection of proof prints to be printed, and this can be based both on the image content as well as the time/position in the print sequence.

Proof prints printed using simulated misdirected and missing jets are presented to the customer to determine acceptability. The frequency of mitigation measures, such as a mini purge, may be increased if the customer decides that the proof prints are unacceptable. Missing jets for the proof prints are simulated by turning off the nozzles in question in the image path. Misdirected jets for the proof prints are simulated by reducing the voltage to the specific nozzles to achieve a desired level of simulated misdirectionality.

Further, with systems and methods, automated learning systems are used to track operator acceptance or rejection of the proof prints. Once trained, these systems and methods can bypass the operator to perform the processing in a fully automated manner. This permits training regarding the acceptability of the prints to be specific for each particular operator.

Figure 1:
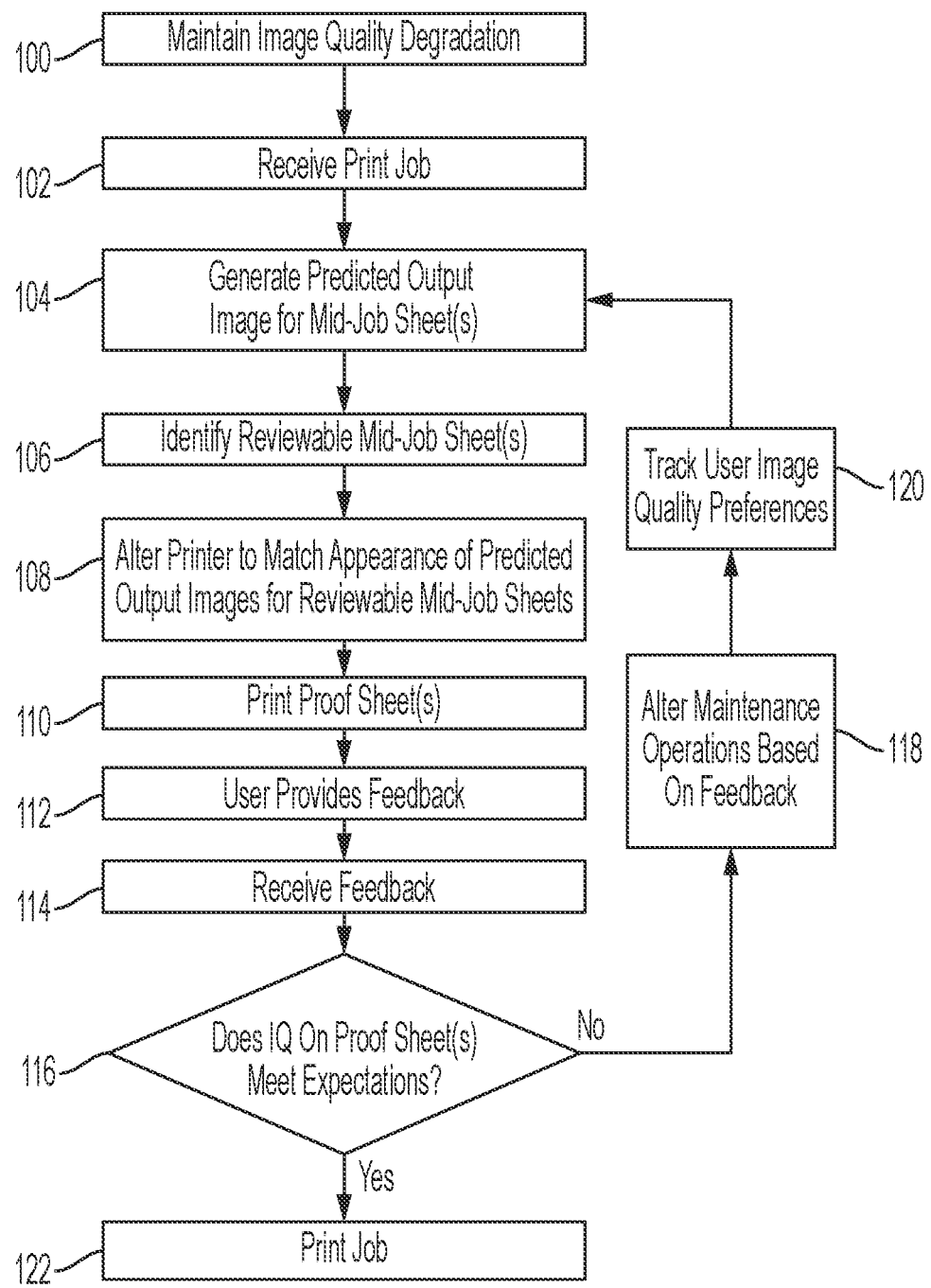
FIGS. 1-2 are flow diagrams of various methods herein.

FIG. 1 is flowchart illustrating exemplary methods herein. In item 100, these methods maintain intra-job image quality degradation for a printing device based on historical performance of the printing device. These methods receive a print job in item 102 that includes instructions to print a plurality of printed sheets in a sheet printing sequence.

In response, in item 104 these methods generate a predicted output image for a mid-job sheet (of the printed sheets) based on the intra-job image quality degradation and the sheet count of the mid-job sheet within the sheet printing sequence. The intra-job image quality degradation predicts changes in printed intra-job image quality of sheets printed by the printing device over time. The process of generating the predicted output image in item 104 is also based on the area coverage amount of marking material (e.g., the printing density or darkness, etc.) scheduled to be used printing the printed sheets that have a lower sheet count relative to the sheet count of the mid-job sheet.

As noted above, with prolonged printing (printing jobs of many pages) the printhead can suffer from degradation in jet health. In other words, as the printer operates continuously during a print job, the quality of printing may decrease. The degradation of quality can manifest itself in poor directionality of the jets, split jets, weak jets, intermittent jets, and eventually missing jets. In addition, relatively lower area coverage printing immediately following relatively higher area coverage printing may result in ghosting in the subsequent prints. Thus, this generation of the predicted output image in item 104 generally decreases the intra-job image quality estimate as the sheet count within the sheet printing sequence increases.

Generation of the predicted output image in item 104 can be performed for every sheet in the job or less than all sheets. For example, the predicted output image may only be generated for the last portion of the print job (e.g., the last 30%, 50%, 75%, of the sheets in the printing sequence, etc.). Alternatively, sheet counts can determine which sheets are simulated (e.g., every 100th sheet, every 250th sheet, etc. in the printing sequence). In other embodiments, sheets at different percentages of job completion points can be selected for prediction/simulation (e.g., the sheet at every 10%, 25%, completion point, etc.). Thus, all sheets or less than all sheets can be selected to be simulated to generate the predicted output images in item 104.

Next, in item 106 from the predicted output images generated in item 104, these methods can identify "reviewable" mid-job sheets (e.g., those sheets that will be presented for manual or automated review). If a very limited number of predicted output images are produced in item 104, all such predicted output images can be selected as reviewable mid-job sheets.

The identification in item 106 can be, for example, random or based on a specific predicted output image count interval. Item 106 can alternatively identify reviewable mid-job sheets as those having a predicted output image that has an image quality that falls below an image quality standard. Thus, in addition to selecting reviewable mid-job sheets randomly or at regular intervals, in some examples herein only the very lowest image quality examples can be selected for user review. Therefore, in one example, a minimum image quality standard can be used to select the reviewable mid-job sheets, or the last portion of lowest quality sheets (e.g., 5%, 2% lowest quality sheets) can be selected for user review.

In item 108 these methods alter the printing characteristics of the printing device individually for each proof sheet printed so each proof sheet matches the appearance of the corresponding predicted output image. The printing characteristics of the printer are altered in item 108 by turning off or reducing voltages to printing elements to represent failed printing elements (e.g., non-operating or clogged jets) and by lowering peak piezo voltage (Vpp) applied to the printhead to represent misdirected printing elements (e.g., weak or partially clogged jets). In item 110, such methods print one or more proof sheets using the altered printing characteristics so that the proof sheets match the appearance of the predicted output images (for the reviewable mid-job sheets).

The printing characteristics are altered in item 108 to show how the reviewable mid-job sheets would appear if they were actually printed mid-job instead of during initial limited proof printing performed with an unfatigued printhead. Mid-job printhead fatigue is a situation that occurs when a printhead suffers image quality degradation in the middle of print job because of resource and device usage resulting from immediate, continuous printing of previous sheets in the printing sequence of the print job. Mid-job printhead fatigue generally gets worse for later sheets in the printing sequence because the printhead is not allowed to recover mid-job. However, such image quality issues subside after the printhead has experienced some form of maintenance mid-job (e.g., printhead cleaning and clearing, etc.) since the last printing occurred, which allows the printhead to recover to a previous image quality standard (e.g., return to an unfatigued printhead).

Note that a printhead may have permanent image quality issues (e.g., permanently clogged jets, etc.) and therefore may have an unfatigued image quality that is less than perfect. However, the mid-job fatigue is a further reduction in image quality from the unfatigued image quality standard, even considering permanent image quality issues of a given printhead.

In other words, in items 108 and 110, rather than just printing proof prints for user review without any image quality defects using an unfatigued printhead, these methods alter the printing device to simulate the image quality a fatigued printhead would produce when the mid-job sheets are printed in their print job assigned location/position within the printing sequence. This allows the user to review the proofs as they would appear when printed immediately after many other previous sheets in the print job have been printed. Items 108 and 110 provide the user more realistic proofs that have appearances more closely matching how those sheets will appear when the full job is actually printed and as the printhead image quality performance progressively degrades as the print job progresses (e.g., as the printhead fatigues).

In response, the user reviews the proof sheets and manually provides feedback (e.g., through the user interface of a computer or the printing device) as shown in item 112. In item 114, these methods receive feedback from the user regarding the acceptability of the proof sheets. Item 116 in FIG. 1 shows that this processing determines whether the image quality (IQ) of the proof sheets met the expectations of the user, based on the feedback.

If the feedback 112 indicates that the proof sheets met the expectations of the user, the print job is printed in item 122. If not, in item 118, these methods alter maintenance operations performed during printing of the print job (e.g., by increasing the frequency of print head cleaning and clearing procedures), after which the processing returns to item 104 to generate new predicted output images; however, the predicted output images are predicted using the altered maintenance operations. As noted above increased (more frequent) maintenance operations mid-job increases job quality, for example, by performing purge operations to allow a fatigued printhead to recover to an unfatigued printhead. Additionally, in item 120, methods herein can track the user's image quality preferences to establish user-specific historical preferences that can be used to automatically determine whether to alter maintenance operations, as shown in FIG. 2, discussed below.

Figure 2:
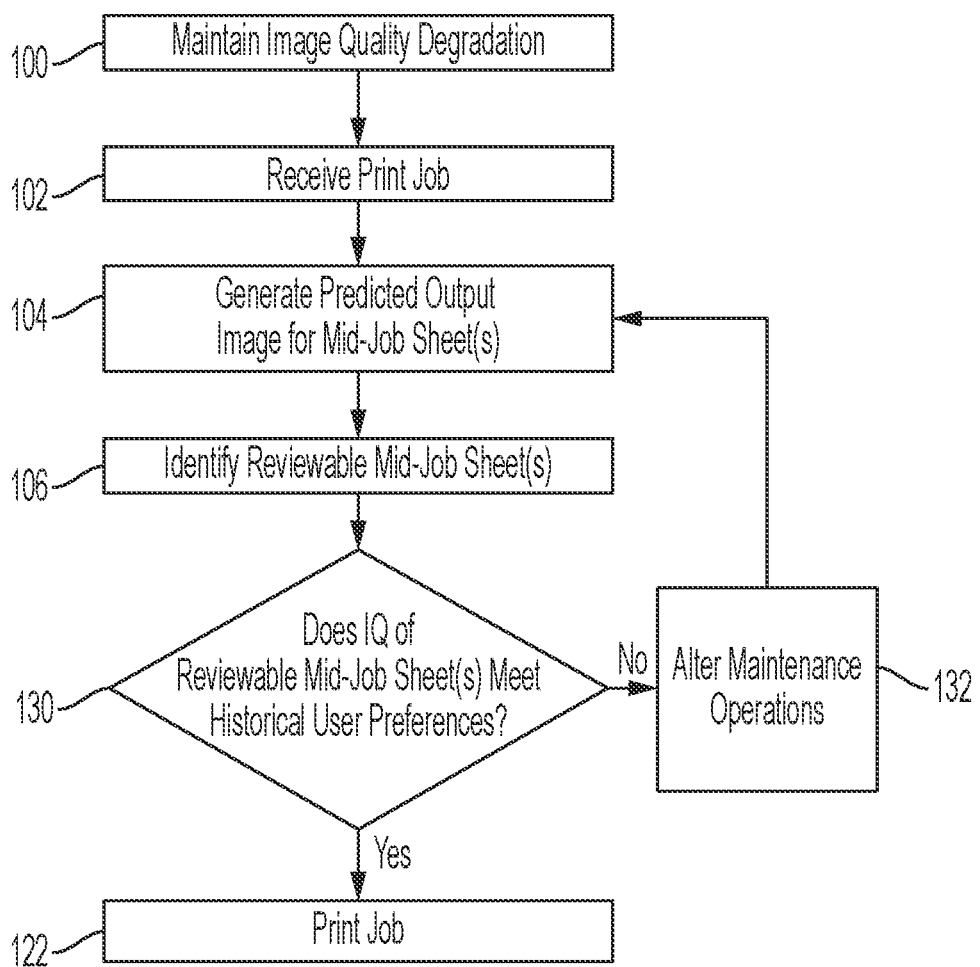

More specifically, FIG. 2 is similar to FIG. 1 (and the same processes are shown using the same numbers used in FIG. 1, and a redundant discussion of those items is not repeated here for brevity); however, some processes are eliminated (items 108-120) from the processing shown in FIG. 2 and other different processes (items 130-132) are utilized.

The processing in FIG. 2 is performed after the processing in FIG. 1 has been performed to a sufficient number of times for a user to establish the user-specific historical preferences (item 120, FIG. 1) for a given user. Thus, in FIG. 2 the processing shown in items 100, 102, 104, and 106 is the same as that in FIG. 1, and reference is made to the previous discussion. In item 130, the processing in FIG. 2 automatically determines whether the image quality of the predicted output images (from item 104) of the reviewable mid-job sheets (from item 106) meets or exceeds the user-specific historical preferences (from item 120 in FIG. 1).

Again, this processing is user-specific and automatically alters the maintenance operations 132 based on the fully automated decision made in item 130 to match the decisions the specific user had made previously many times as the user provided feedback (item 112) which was tracked as user image quality preferences (item 120) in the processing shown in FIG. 1. Similar to the processing shown in item 118 in FIG. 1, in FIG. 2, the processing in item 132 can increase the frequency of print head cleaning and clearing procedures, etc.

Thus, in FIG. 2, if the image quality of the predicted output images (from item 104) of the reviewable mid-job sheets (from item 106) meets or exceeds the user-specific historical preferences in item 130, the print job is printed in item 122. If not, in item 132, these methods alter maintenance operations performed during printing of the print job and return processing to item 104 to generate new predicted output images that are simulated predicted using the altered maintenance operations. Therefore, processing continuously loops back (from 116 through 120, 104, 106, 108, 110, 112, 114, and back to 116) until the image quality on the proof sheet(s) meets user expectations (item 116), at which point the print job can be printed (item 122).

Figure 3:
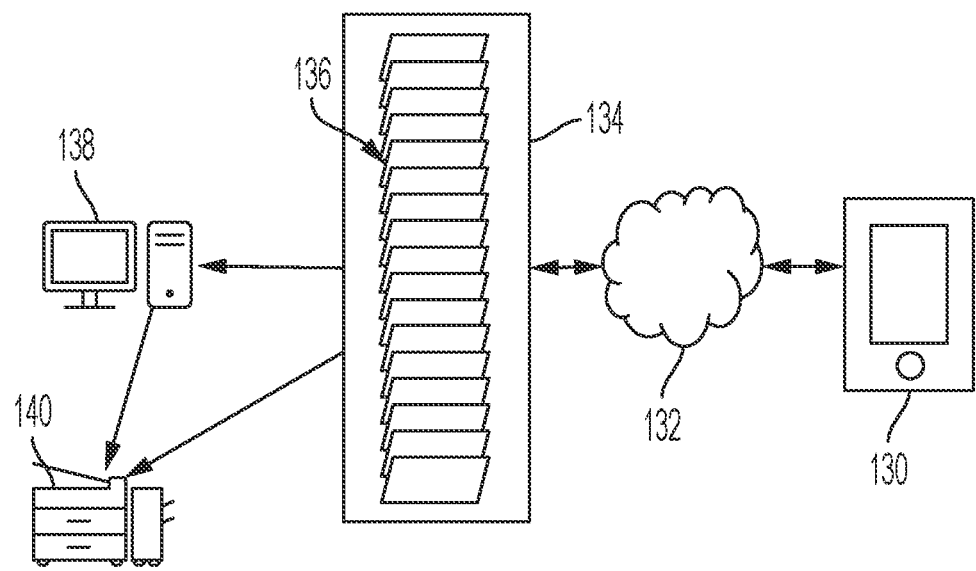
FIGS. 3-6 are schematics diagram illustrating systems performing processing herein.

These concepts are illustrated using a conceptual system shown in FIGS. 3-6. FIG. 3 illustrates a computerized device 130 that is in communication with a network 132. A portable computerized device 130 is used in this example, but item 130 could be any computerized device or printing device whether that device be stand-alone or in communication with a network 132.

Figure 4:
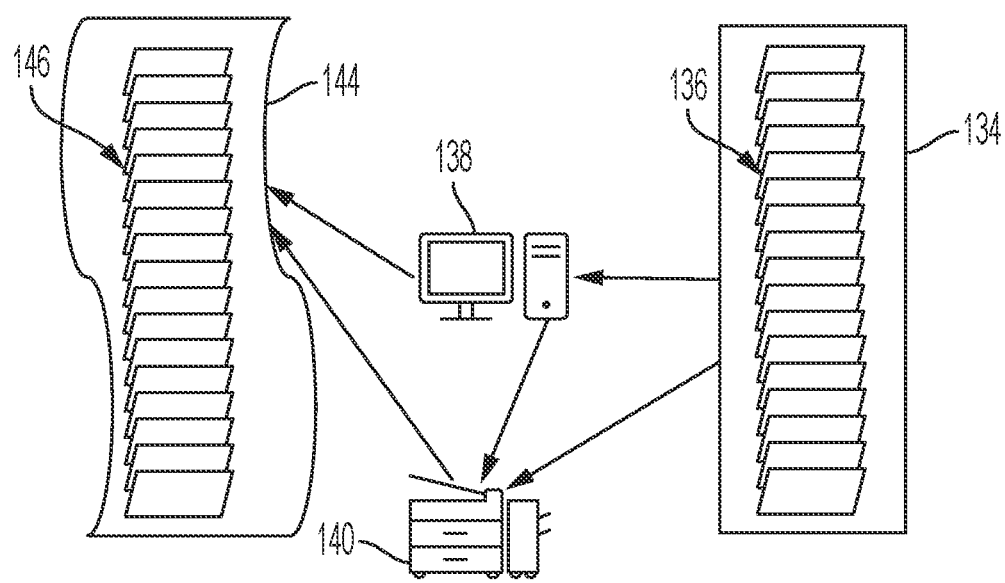

The user of the portable computerized device 130 identifies a print job 134 that may be stored on the network 132. As shown in FIG. 3, the print job 134 has instructions to print many sheets 136 in a printing sequence. The network 132 sends the print job 134 to a printing device 140 or to a computerized device 138 that works with or controls the printing device 140. FIG. 4 illustrates that the computerized device 138 and/or the printing device 140 generate an electronic predicted output image 146 (e.g., a simulated image) for each of the sheets 136 in the print job 134. The predicted output images 146 can be maintained in a temporary file 144, for example.

The computerized device 138 and/or printing device 140 maintain an intra-job image quality degradation measure for the printing device 140 based on historical performance of the printing device 140. As noted above, the intra-job image quality degradation predicts changes in printed intra-job image quality of sheets printed by the printing device 140 over time. For example, very long print jobs or print jobs with heavy printing (e.g., high area coverage, high-density printing) may historically result in larger image quality decreases for a given printer when compared to shorter print jobs or lighter printing occurring at the same printer.

The generation the predicted output images 146 is based on the area coverage amount of marking material (e.g., printing density) scheduled to be used printing the sheets 136 of the print job 134. Specifically, to predict the image quality of sheets that will be printed later in the printing sequence, this process looks at area coverage of the printing occurring on sheets that will be printed earlier in the printing sequence. Thus, the generation of the predicted output images 146 generally decreases the intra-job image quality estimate as the sheet count and area coverage within the sheet printing sequence increases.

Figure 5:
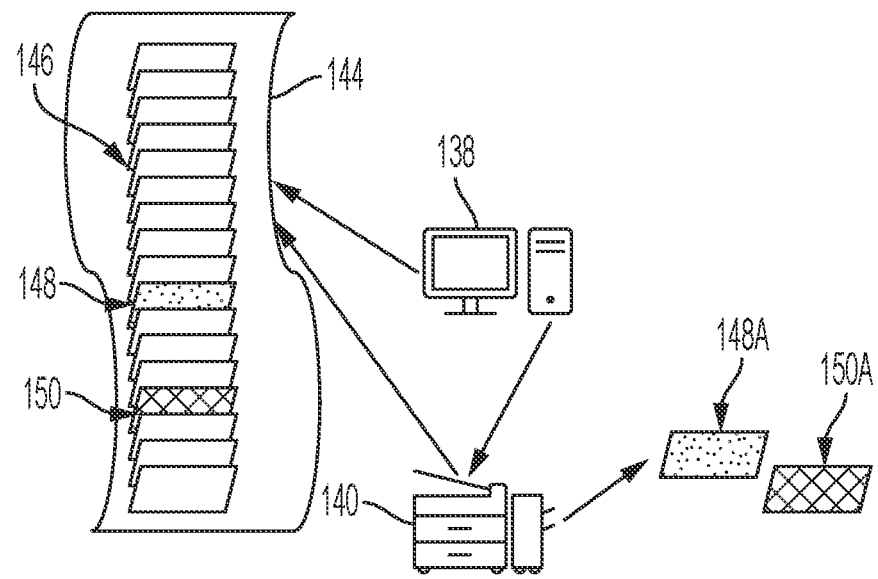

As shown in FIG. 5, all the predicted output images are electrically reviewed by the computerized device 138 and/or printing device 140 and one or more mid-job sheets 148, 150 (of the predicted output images 146) are identified as reviewable mid-job sheets that are selected to be printed as proof prints for user review. This selection can be random or can be based on the intra-job image quality degradation and the sheet count of the mid-job sheet within the sheet printing sequence. For example, the computerized device 138 and/or printing device 140 can identify reviewable mid-job sheets 148, 150 that have a predicted output image 146 that falls below an image quality standard.

FIG. 5 shows that these reviewable mid-job sheets 148, 150 are printed as actual, physical proof sheets 148A, 150A by the printing device 140. When printing proof sheets 148A, 150A, the computerized device 138 and/or printing device 140 alter the printing characteristics of the printing device 140 to print proof sheets 148A, 150A so that they match the simulated appearance of the predicted output images for the reviewable mid-job sheets 148, 150. The printing characteristics of the printing device 140 can be altered, for example, by turning off or reducing voltages to printing elements to represent failed printing elements and lowering peak piezo voltage (Vpp) applied to the printhead to represent misdirected printing elements.

Figure 6:
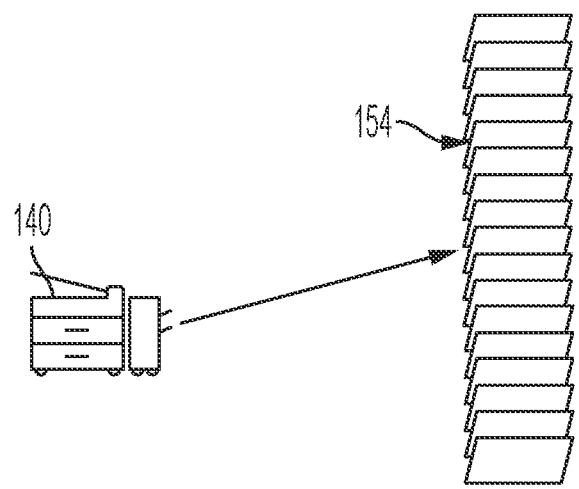

Feedback is received from the user in response to the proof sheets 148A, 150A regarding the acceptability of the proof sheets 148A, 150A. If the feedback indicates that the proof sheets 148A, 150A met the expectations of the user, the print job is printed as printed sheets 154 as shown in FIG. 6 without modifying any aspects of the printing device 140. If not, the processing is repeated until the expectations of the user are met, at which point the print job can be printed 154. Thus, the maintenance operations of the printing device 140 performed during printing 154 of the print job may altered (e.g., by increasing the frequency of print head cleaning and clearing procedures) depending upon user feedback.

As noted above with respect to FIG. 2, the computerized device 138 and/or printing device 140 shown in FIGS. 3-6 can automatically determine whether the image quality of the predicted output images of the reviewable mid-job sheets 148, 150 meets or exceeds the user-specific historical preferences, thereby eliminating the need to print the proof sheets 148A, 150A or obtain user feedback.

Thus, as shown above, with deterioration in image quality over time, the probability that a print job will be considered unacceptable by the user increases significantly. To address these issues, the systems and methods herein print a selection of mid-job proof prints 148A, 150A from the customer submitted print job. Maintenance operations are adjusted to reset the printing device if the user disapproves of the proof prints to achieve user-specific image quality goals for printing the print job.

Figure 7:
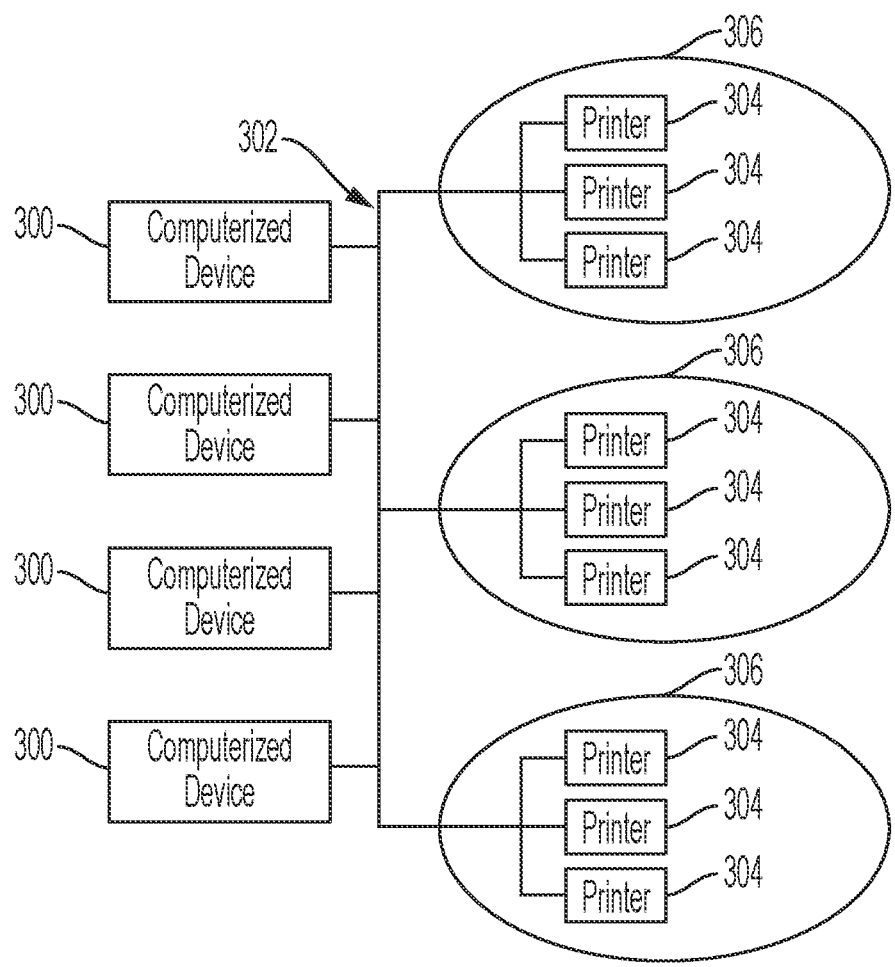
FIG. 7 is a schematic diagram illustrating systems herein.

As shown in FIG. 7, exemplary systems and methods herein include various computerized devices 300, 304 located at various different physical locations 306. The computerized devices 300, 304 can include print servers, printing devices, personal computers, etc., and are in communication (operatively connected to one another) by way of a local or wide area (wired or wireless) network 302.

Figure 8:
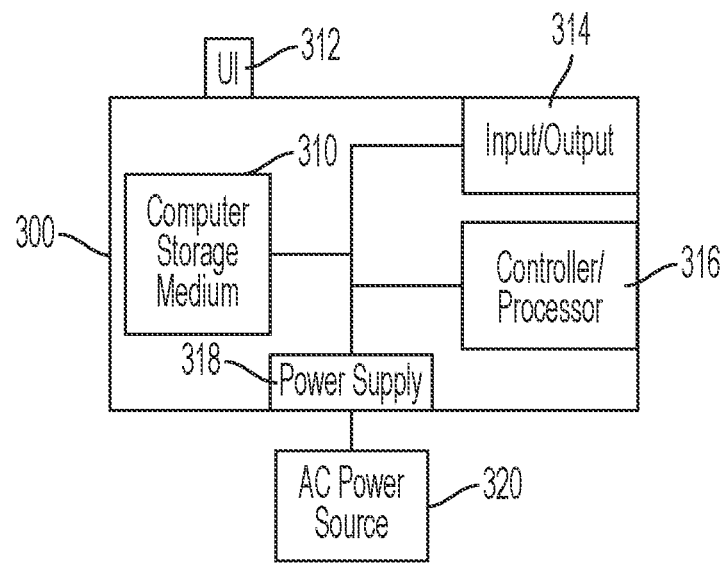
FIGS. 8-11 are schematic diagrams illustrating computing and printing devices herein.

FIG. 8 illustrates a computerized device 300, which can be used with systems and methods herein and can comprise, for example, a print server, a personal computer, a portable computing device, etc. The computerized device 300 includes a controller/tangible processor 316 and a communications port (input/output) 314 operatively connected to the tangible processor 316 and to the computerized network 302 external to the computerized device 300. Also, the computerized device 300 can include at least one accessory functional component, such as a user interface (UI) assembly 312. The user may receive messages, instructions, and menu options from, and enter instructions and feedback through, the user interface or control panel 312.

The input/output device 314 is used for communications to and from the computerized device 300 and comprises a wired device or wireless device (of any form, whether currently known or developed in the future). The tangible processor 316 controls the various actions of the computerized device. A non-transitory, tangible, computer storage medium device 310 (which can be optical, magnetic, capacitor based, etc., and is different from a transitory signal) is readable by the tangible processor 316 and stores instructions that the tangible processor 316 executes to allow the computerized device to perform its various functions, such as those described herein. Thus, as shown in FIG. 8, a body housing has one or more functional components that operate on power supplied from an alternating current (AC) source 320 by the power supply 318. The power supply 318 can comprise a common power conversion unit, power storage element (e.g., a battery, etc.), etc.

Figure 9:
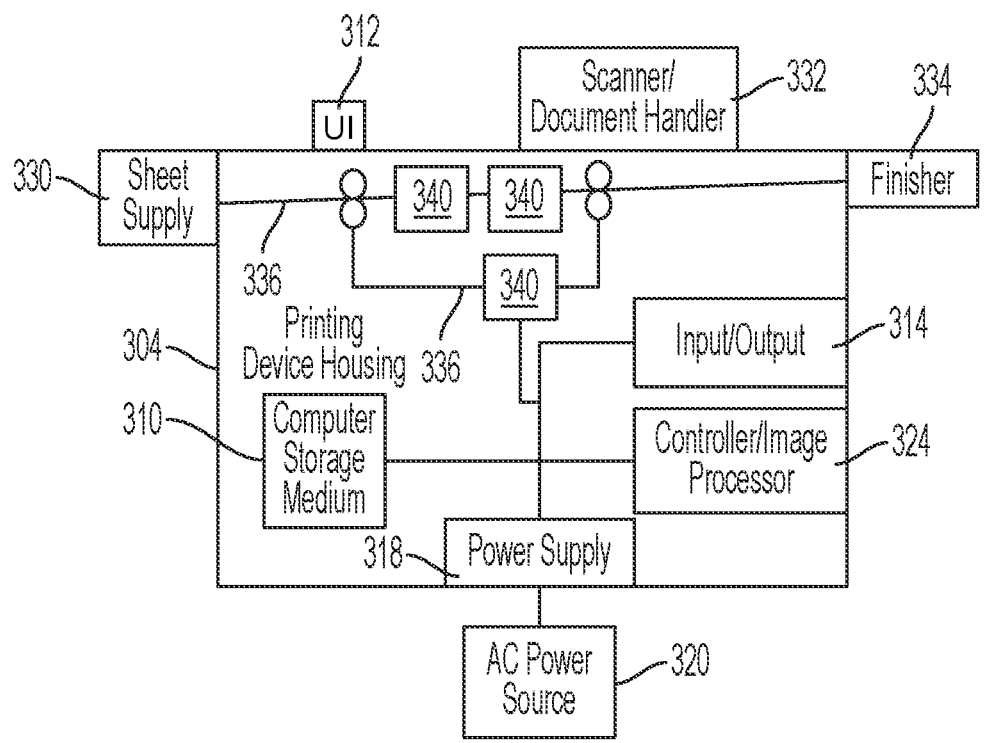

FIG. 9 illustrates a computerized device that is a printing device 304, which can be used with systems and methods herein and can comprise, for example, a printer, copier, multi-function machine, multi-function device (MFD), etc. The printing device 304 includes many of the components mentioned above and at least one marking device (printing engine(s)) 340 operatively connected to a specialized image processor 324 (that may be different from a general purpose computer because it is specialized for processing image data), a media path 336 positioned to supply continuous media or sheets of media from a sheet supply 330 to the marking device(s) 340, etc. After receiving various markings from the printing engine(s) 340, the sheets of media can optionally pass to a finisher 334 which can fold, staple, sort, etc., the various printed sheets. Also, the printing device 304 can include at least one accessory functional component (such as a scanner/document handler 332 (automatic document feeder (ADF)), etc.) that also operate on the power supplied from the external power source 320 (through the power supply 318).

Printing devices herein include (among other components) a printing engine 340, a communications device 314, and a user interface 312 operatively connected to a processor 316, 324. The processor 316, 324 is adapted to maintain intra-job image quality degradation for the printing device based on historical performance of the printing device. The processor 316, 324 is adapted to maintain the intra-job image quality degradation by measuring changes in printed image quality of sheets printed by the printing device over time.

The communications device 314 is adapted to receive a print job that includes instructions to print a plurality of printed sheets in a sheet printing sequence. The processor 316, 324 is adapted to generate a predicted output image for the printed sheets based on the intra-job image quality degradation and the sheet count of the printed sheets within the sheet printing sequence. When generating the predicted output image, the processor 316, 324 is adapted to decrease the image quality estimate as the sheet count within the sheet printing sequence increases.

The processor 316, 324 is adapted to identify reviewable mid-job sheets having a predicted output image that falls below an image quality standard. The processor 316, 324 is adapted to generate the predicted output image based on the area coverage amount of marking material scheduled to be used printing the printed sheets that have a lower sheet count relative to the sheet count of the reviewable mid-job sheets.

The printing engine 340 is adapted to alter printing characteristics to print proof sheets matching the appearance of the predicted output image for each of the reviewable mid-job sheets. The printing engine 340 is adapted to alter the printing characteristics by, for example, turning off voltages to printing elements to represent failed printing elements and lowering peak piezo voltage (Vpp) applied to the printhead to represent misdirected printing elements.

The user interface 312 is adapted to receive feedback regarding the proof sheets. The processor 316, 324 is adapted to alter maintenance operations performed during printing of the print job based on the feedback. For example, the processor 316, 324 is adapted to alter maintenance operations by increasing print head cleaning and clearing procedures.

Figure 10:
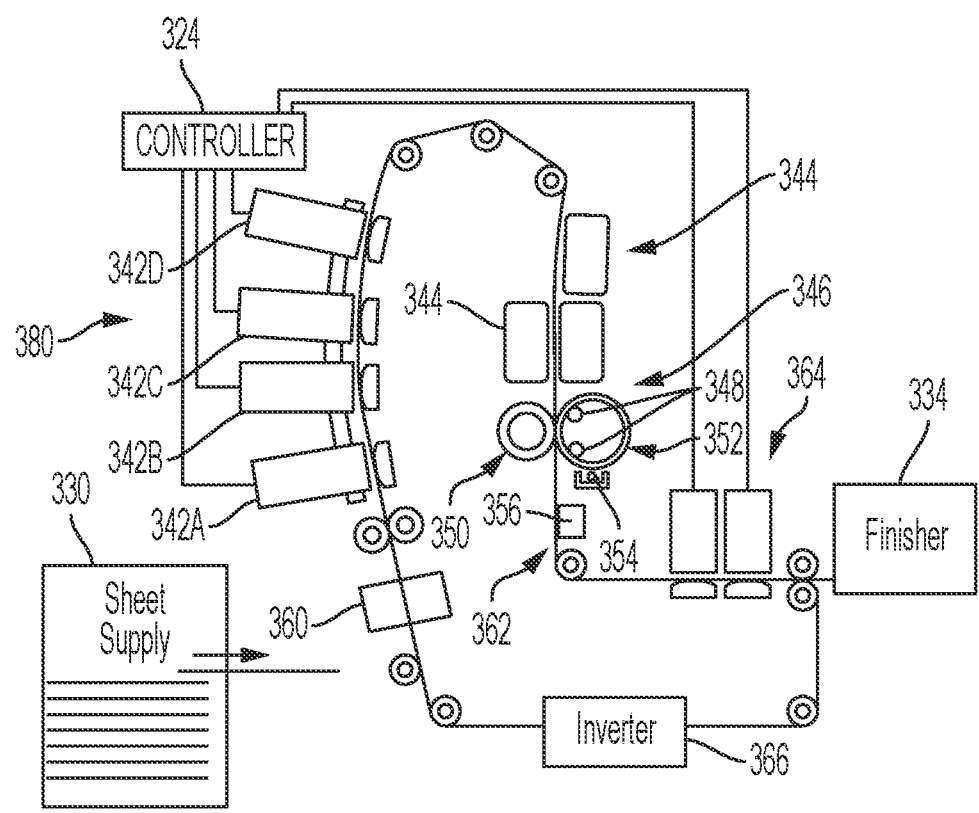
Figure 11:
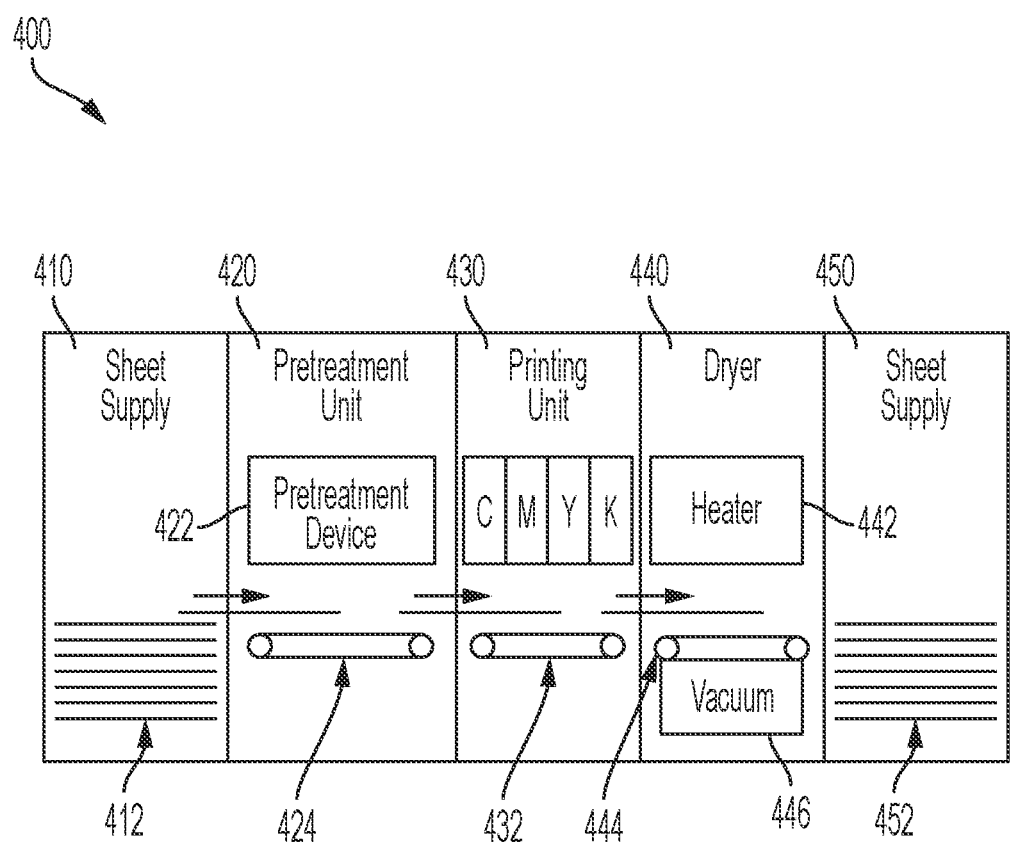

The one or more printing engines 340 are intended to illustrate any marking device that applies a marking material (toner, inks, etc.) to continuous media or sheets of media, whether currently known or developed in the future and can include, for example, devices that use an ink jet imaging system, as shown in FIG. 10, or a high-speed aqueous imaging system, as shown in FIG. 11.

More specifically, FIG. 10 illustrates one example of the above-mentioned printing engine(s) 380 that is an ink jet imaging system. In this example, the imaging apparatus 380 is in the form of an ink jet printer that employs one or more ink jet printheads, each with an associated solid ink supply (342A-342D). The exemplary direct-to-sheet phase-change ink jet imaging system 380 includes a media supply and handling system 330 configured to supply media (e.g., paper, plastic, or other printable material). A media conditioner 360, printed sheet conditioner 344, coating station 364, and finisher 334.

The media is propelled by a sheet transport 362 that can include a variety of motors rotating one or more rollers. For duplex operations, an inverter 366 may be used to flip the sheet over to present a second side of the media to the printheads 342A-342D.

The media conditioner 360 includes, for example, a pre-heater. The pre-heater brings the media to an initial predetermined temperature that is selected for desired image characteristics corresponding to the type of media being printed as well as the type, colors, and number of inks being used. The pre-heater may use contact, radiant, conductive, or convective heat to bring the media to a target preheat temperature.

The media is transported through a printing station that includes a series of color printheads 342A-342D, each color unit effectively extending across the width of the media and being able to place ink directly (i.e., without use of an intermediate or offset member) onto the moving media. As is generally familiar, each of the printheads may eject a single color of ink, one for each of the colors typically used in color printing, namely, cyan, magenta, yellow, and black (CMYK). A controller 324 generates timing signals for actuating the ink jet ejectors in the printheads 342A-342D in synchronization with the passage of the media to enable the four colors to be ejected with a reliable degree of accuracy for registration of the differently colored patterns to form four primary-color images on the media. The ink jet ejectors are actuated by the firing signals to correspond to image data processed by the controller 324 that may be transmitted to the printer, generated by a scanner (not shown) that is a component of the printer, or otherwise generated and delivered to the printer. In various possible embodiments, a color unit for each primary color may include one or more printheads; multiple printheads in a color unit may be formed into a single row or multiple row array; printheads of a multiple row array may be staggered; a printhead may print more than one color; or the printheads or portions of a color unit may be mounted movably in a direction transverse to the process direction, such as for spot-color applications and the like.

Each of color printheads 342A-342D may include at least one actuator configured to adjust the printheads in each of the printhead modules in the cross-process direction across the media web. In a typical embodiment, each motor is an electromechanical device such as a stepper motor or the like. In a practical embodiment, a print bar actuator is connected to a print bar containing two or more printheads and is configured to reposition the print bar by sliding the print bar along the cross-process axis of the media web. In alternative embodiments, an actuator system may be used that does not physically move the printheads, but redirects the image data to different ejectors in each head to change head position.

The printer may use liquid ink or "phase-change ink," by which is meant that the ink is substantially solid at room temperature and substantially liquid when heated to a phase change ink melting temperature for jetting onto the imaging receiving surface. The phase change ink melting temperature may be any temperature that is capable of melting solid phase change ink into liquid or molten form. As used herein, liquid ink refers to melted solid ink, heated gel ink, or other known forms of ink, such as aqueous inks, ink emulsions, ink suspensions, ink solutions, or the like.

Associated with each color unit is a backing member, typically in the form of a bar or roll, which is arranged substantially opposite the color unit on the back side of the media. Each backing member is used to position the media at a predetermined distance from the printheads opposite the backing member. Each backing member may be configured to emit thermal energy to heat the media to a predetermined temperature.

Following the printing zone along the media path are one or more "mid-heaters" 344. A mid-heater 344 may use contact, radiant, conductive, and/or convective heat to control a temperature of the media and particularly to bring the media to a temperature suitable for desired properties when passing through the spreader 346. A fixing assembly in the form of the "spreader" 346 is configured to apply heat and/or pressure to the media to fix the images to the media. The function of the spreader 346 is to take what are essentially droplets, strings of droplets, or lines of ink on the sheet and smear them out by pressure and, in some systems, heat, so that spaces between adjacent drops are filled and image solids become uniform. The spreader 346 may include rollers, such as image-side roller 352 and pressure roller 350, to apply heat and pressure to the media, either of which can include heating elements, such as heating elements 348, to bring the media to a predetermined temperature. The spreader 346 may also include a cleaning/oiling station 354 associated with image-side roller 352. The station 354 cleans and/or applies a layer of some release agent or other material to the roller surface. A coating station 364 applies a clear ink to the printed media to modify the gloss and/or to help protect the printed media from smearing or other environmental degradation following removal from the printer.

Operation and control of the various subsystems, components and functions of the imaging system are performed with the aid of the controller 324. The controller 324 may be implemented with general or specialized programmable processors that execute programmed instructions. The controller 324 may be operatively coupled to the print bar and printhead actuators of color printheads 342A-342D in order to adjust the position of the print bars and printheads along the cross-process axis of the media web. In particular, the controller may be operable to shift one or more, or all, of the color units laterally or transverse to the process direction.

The imaging system may also include an optical imaging system 356 that is configured in a manner similar to that for creating the image to be transferred to the web. The optical imaging system is configured to detect, for example, the presence, intensity, and/or location of ink drops jetted onto the receiving member by the ink jets of the printhead assembly. The imaging system may incorporate a variety of light sources capable of illuminating the printed web sufficient to detect printing errors that may be attributable to a faulty or defective ink jet or printhead. The imaging system 356 further includes an array of light detectors or optical sensors that sense the image reflected from the printed web prior to discharge. The controller 324 analyzes the information from the imaging system 356 to determine, among other things, whether a failure or an ink jet or printhead has occurred. The location of the defective printing element is identified and made available to the maintenance technician during a diagnosis procedure. The controller 324 may also use the data obtained from the imaging system 356 to adjust the registration of the color units such as by moving a color unit or one or more printheads. This image data may also be used for color control.

FIG. 11 illustrates an inkjet or aqueous ink printer system 400 that is one of the printers 304, discussed above. Specifically, FIG. 11 illustrates a high-speed ink jet or aqueous ink image producing machine or printer 400. The printer 400 includes a media supply 410, a pretreatment unit 420, a printing unit 430, a dryer 440, and a sheet stacker 450. The media supply 410 stores a plurality of media sheets 412 for printing by the printer 400.

The pretreatment unit 420 includes at least one pretreatment device 422 and transport belt 424. The pretreatment unit 420 receives the media sheets from the media supply 410 and transports the media sheets in a process direction (block arrows in FIG. 11) through the pretreatment unit 420. The pretreatment device 422 conditions the media sheets and prepares the media sheets for printing in the printing unit 430. The pretreatment unit 420 may include, for example, a coating device that applies a coating to the media sheets, a drying device that dries the media sheets, and/or a heating device that heats the media sheets to a predetermined temperature. In some embodiments, the printer 400 does not include a pretreatment unit 420 and media sheets are fed directly from the media supply 410 to the printing unit 430. In other embodiments, the printer 400 may include more than one pretreatment unit.

The printing unit 430 includes at least one marking unit transport belt 432 that receives the media sheets from the pretreatment unit 420 or the media supply 410 and transports the media sheets through the printing unit 430. The printing unit 430 further includes at least one printhead (labeled CMYK in FIG. 11 to represent the standard cyan, magenta, yellow, and black color printheads; however any color printheads could be used). The printhead (CMYK) ejects aqueous ink onto the media sheets as the media sheets are transported through the printing unit 430. In the illustrated embodiment, the printing unit 430 includes four printheads (CMYK), each of which ejects one of cyan, magenta, yellow, and black ink onto the media sheets. The reader should appreciate, however, that other embodiments include other printhead arrangements, which may include more or fewer printheads, arrays of printheads, etc.

The dryer 440 includes a heater 442 and a vacuum drying belt 444 that receives the media sheets from the printing unit 430. A vacuum plenum 446 connects to a vacuum blower or the plumbing that is connected to a vacuum blower at one side in the cross-process direction. The sheet stacker 450 receives and stacks the printed sheets 452.

While FIGS. 10 and 11 illustrate four marking stations 342, 350 adjacent or in contact with a rotating belt (348, 360), which is useful with systems that mark in four different colors such as, red, green, blue (RGB), and black; or cyan, magenta, yellow, and black (CMYK), as would be understood by those ordinarily skilled in the art, such devices could use a single marking station (e.g., black) or could use any number of marking stations (e.g., 2, 3, 5, 8, 11, etc.).

The print media is then transported by the sheet output transport 336 to output trays or a multi-function finishing station 334 performing different desired actions, such as stapling, hole-punching and C or Z-folding, a modular booklet maker, etc., although those ordinarily skilled in the art would understand that the finisher/output tray 334 could comprise any functional unit.

As would be understood by those ordinarily skilled in the art, the printing devices shown above are only examples and the systems and methods herein are equally applicable to other types of printing devices that may include fewer components or more components. For example, while a limited number of printing engines and paper paths are illustrated in, those ordinarily skilled in the art would understand that many more paper paths and additional printing engines could be included within any printing device used with systems and methods herein.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

The terms automated or automatically mean that once a process is started (by a machine or a user), one or more machines perform the process without further input from any user. Additionally, terms such as "adapted to" mean that a device is specifically designed to have specialized internal or external components that automatically perform a specific operation or function at a specific point in the processing described herein, where such specialized components are physically shaped and positioned to perform the specified operation/function at the processing point indicated herein (potentially without any operator input or action). In the drawings herein, the same identification numeral identifies the same or similar item.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A printing device comprising:
a processor,
a printing engine operatively connected to the processor;
a communications device operatively connected to the processor; and
a user interface operatively connected to the processor,
wherein the processor is adapted to maintain image quality degradation for the printing device,
wherein the communications device is adapted to receive a print job that includes instructions to print a plurality of printed sheets in a sheet printing sequence,
wherein the processor is adapted to generate a predicted output image for a mid-job sheet of the printed sheets based on the image quality degradation and a sheet count of the mid-job sheet within the sheet printing sequence,
wherein the printing engine is adapted to alter printing characteristics to print a proof sheet matching an appearance of the predicted output image, and
wherein the processor is adapted to generate the predicted output image based on an area coverage amount of marking material scheduled to be used printing ones of the printed sheets that have a lower sheet count relative to the sheet count of the mid-job sheet.

2. The printing device according to claim 1, wherein, when generating the predicted output image, the processor is adapted to decrease an image quality estimate as the sheet count within the sheet printing sequence increases.

3. The printing device according to claim 1, wherein the processor is adapted to alter maintenance operations by increasing print head cleaning and clearing procedures.

4. The printing device according to claim 1, wherein the processor is adapted to maintain the image quality degradation based on historical performance of the printing device.

5. The printing device according to claim 1, wherein the printing engine is adapted to alter the printing characteristics by turning off voltages to printing elements to represent failed printing elements, and by lowering peak piezo voltage (Vpp) applied to the printing engine to represent misdirected printing elements.

6. The printing device according to claim 1, wherein the processor is adapted to maintain the image quality degradation by measuring changes in printed image quality of sheets printed by the printing device over time.

7. A printing device comprising:
a processor,
a printing engine operatively connected to the processor;
a communications device operatively connected to the processor; and
a user interface operatively connected to the processor,
wherein the processor is adapted to maintain intra-job image quality degradation for the printing device,
wherein the communications device is adapted to receive a print job that includes instructions to print a plurality of printed sheets in a sheet printing sequence,
wherein the processor is adapted to generate predicted output images for the printed sheets based on the intra-job image quality degradation and a sheet count of the printed sheets within the sheet printing sequence,
wherein the processor is adapted to identify reviewable mid-job sheets as ones of the predicted output images having an image quality image below an image quality standard,
wherein the printing engine is adapted to alter printing characteristics to print proof sheets matching an appearance of the predicted output image for each of the reviewable mid-job sheets,
wherein the user interface is adapted to receive feedback regarding the proof sheets,
wherein the processor is adapted to alter maintenance operations performed during printing of the print job based on the feedback, and
wherein the processor is adapted to generate the predicted output image based on an area coverage amount of marking material scheduled to be used printing ones of the printed sheets that have a lower sheet count relative to the sheet count of the mid-job sheet.

8. The printing device according to claim 7, wherein, when generating the predicted output images, the processor is adapted to decrease an image quality estimate as the sheet count within the sheet printing sequence increases.

9. The printing device according to claim 7, wherein the processor is adapted to alter maintenance operations by increasing print head cleaning and clearing procedures.

10. The printing device according to claim 7, wherein the processor is adapted to maintain the image quality degradation based on historical performance of the printing device.

11. The printing device according to claim 7, wherein the printing engine is adapted to alter the printing characteristics by turning off voltages to printing elements to represent failed printing elements, and by lowering peak piezo voltage (Vpp) applied to the printing engine to represent misdirected printing elements.

12. The printing device according to claim 7, wherein the processor is adapted to maintain the intra-job image quality degradation by measuring changes in printed image quality of sheets printed by the printing device over time.

13. A method comprising:
maintaining image quality degradation for a printing device;
receiving a print job that includes instructions to print a plurality of printed sheets in a sheet printing sequence;
generating a predicted output image for a mid-job sheet of the printed sheets based on the image quality degradation and a sheet count of the mid-job sheet within the sheet printing sequence, wherein the generating of the predicted output image is further based on an area coverage amount of marking material scheduled to be used printing ones of the printed sheets that have a lower sheet count relative to the sheet count of the mid-job sheet;
altering printing characteristics of the printing device to print a proof sheet matching an appearance of the predicted output image;
receiving feedback regarding the proof sheet; and
altering maintenance operations performed during printing of the print job based on the feedback.

14. The method according to claim 13, wherein the generating of the predicted output image decreases an image quality estimate as the sheet count within the sheet printing sequence increases.

15. The method according to claim 13, wherein the altering maintenance operations comprises increasing print head cleaning and clearing procedures.

16. The method according to claim 13, wherein the maintaining image quality degradation is based on historical performance of the printing device.

17. The method according to claim 13, wherein the printing characteristics are altered by turning off voltages to printing elements to represent failed printing elements, and by lowering peak piezo voltage (Vpp) applied to the printing device to represent misdirected printing elements.

* * * * *